US008396478B2

(12) United States Patent
Voyer et al.

(10) Patent No.: US 8,396,478 B2

(45) **Date of Patent: *Mar. 12, 2013**

(54) FIRST BASE STATION MANAGING A NEIGHBORING CONDITION AND CELL AREA OPERATION OF A CELL AREA, AND SYSTEM FOR MANAGING A NEIGHBORING CONDITION AND CELL AREA OPERATION OF A CELL AREA

(75) Inventors: Nicolas Voyer, Rennes (FR); Eric Lavillonniere, Rennes (FR); Sophie Pautonnier-Perrot, Rennes (FR)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/293,824

(22) Filed: Nov. 10, 2011

(65) Prior Publication Data

US 2012/0058793 A1 Mar. 8, 2012

Related U.S. Application Data

(60) Continuation of application No. 12/876,792, filed on Sep. 7, 2010, now Pat. No. 8,095,136, which is a division of application No. 11/524,186, filed on Sep. 21, 2006, now Pat. No. 8,073,445.

(30) Foreign Application Priority Data

Oct. 13, 2005 (EP) .................................... 05292163

(51) Int. Cl.
*H04W 36/00* (2009.01)

(52) U.S. Cl. ........ 455/436; 455/437; 455/439; 455/440; 455/442; 455/443; 455/446

(58) Field of Classification Search ............... 455/432.1, 455/442, 446, 435.1, 444, 443, 436, 437, 455/439, 440
See application file for complete search history.

(56) References Cited

U.S. PATENT DOCUMENTS

| | | | | |
|---|---|---|---|---|
| 5,864,764 | A | 1/1999 | Thro et al. | |
| 6,014,565 | A | 1/2000 | Bonta | |
| 6,122,262 | A | 9/2000 | Desseignes et al. | |
| 6,292,891 | B1 | 9/2001 | Bergenwall et al. | |
| 6,360,098 | B1 | 3/2002 | Ganesh et al. | |
| 7,013,141 | B2 | 3/2006 | Lindquist et al. | |
| 7,206,584 | B2 | 4/2007 | Abusch-Magder et al. | |
| 7,415,273 | B2 | 8/2008 | Khawand | |
| 2003/0157921 | A1 * | 8/2003 | Kekki et al. | 455/403 |
| 2005/0272403 | A1 * | 12/2005 | Ryu et al. | 455/403 |
| 2006/0068789 | A1 * | 3/2006 | Vannithamby et al. | 455/436 |

FOREIGN PATENT DOCUMENTS

| | | | |
|---|---|---|---|
| EP | 0 654 952 | A2 | 5/1995 |
| GB | 2 331 892 | A | 6/1999 |

* cited by examiner

*Primary Examiner* — Kamran Afshar
*Assistant Examiner* — Khalid Shaheed
(74) *Attorney, Agent, or Firm* — Oblon, Spivak, McClelland, Maier & Neustadt, L.L.P.

(57) ABSTRACT

The present invention concerns a first base station managing a neighboring condition and cell area operation of a cell area, the cell area being a cell area of a wireless cellular network, the wireless cellular network comprising a telecommunication network enabling a transfer of information between the first base station and a second base station, where the wireless cellular network comprises a server linked to the telecommunication network.

14 Claims, 5 Drawing Sheets

20 Server
10c P10c1 50 Base station P10c2
P10d1 10d Base station P10d2 Co2 Network
15d Cell Co1
P10a2 P10b1 P10b2
10a Base station P10a1 10b Base station
15a Cell 15b Cell 30

FIRST BASE STATION MANAGING A NEIGHBORING CONDITION AND CELL AREA OPERATION OF A CELL AREA, AND SYSTEM FOR MANAGING A NEIGHBORING CONDITION AND CELL AREA OPERATION OF A CELL AREA

CROSS-REFERENCE TO RELATED APPLICATIONS

This application is a continuation of application of, and claims the benefit of priority under 35 U.S.C. §120 from, U.S. application Ser. No. 12/876,792, filed Sep. 7, 2010 now U.S. Pat. No. 8,095,136, which is a divisional of U.S. application Ser. No. 11/524,186, filed Sep. 21, 2006 now U.S. Pat. No. 8,073,445, both of the above applications are herein incorporated by reference, which claims the benefit of priority under 35 U.S.C. §119 from European Patent Application No. 05 292163.2, filed Oct. 13, 2005.

BACKGROUND OF THE INVENTION

1. Field of the Invention

The present invention relates generally to the field of the determination if a first cell of a wireless cellular network managed by a first base station in neighbour of a second cell of the wireless cellular network managed by a second base station.

2. Description of the Related Art

Current wireless cellular networks are based on a centralised architecture. A base station controller controls multiple base station, which in turn aim at covering, given cells. When a cellular wireless mobile network operator wishes to add a cell in its network, it usually achieves the following operations. First, it installs the base station on the site and connects it physically to its serving base station controller. Then, it configures the base station controller so that base station controller configures the base station with its operation domain such as the frequency of time slots or codes used for its operations.

In addition, the base station controller handles the handover procedures of mobile terminals from/to newly added cell to/from existing neighbouring cells, so that mobile terminals wandering in an area served by such cell can continue their communications seamlessly while moving from one cell to another.

In order to enable handover procedure, the base station controller has to be aware of neighbouring conditions between the newly added cell and existing cells. Usually, such determination of neighbouring conditions is defined according to radio network planning techniques.

Radio network planning is classically determined by simulation methods. Prior to installing a base station on a given site, the cells that would be the neighbouring cells of this newly introduced cell are determined. Such simulation methods usually require a fine knowledge of antenna type, position and steering used to operate each cell, as well as information related to radio wave propagation in the vicinity of the cell.

Such techniques are adapted for centralized wireless cellular networks or to wireless cellular networks which doesn't evolve a lot in the time. If the number of base stations which have to be added is rather important, or if one or several base stations need to be moved from one location to another one or if some base stations are powered off periodically, as for maintenance purpose, such techniques are not efficient.

SUMMARY OF THE INVENTION

The present invention relates generally to the field of the determination neighboring condition and cell area operation of a cell area managed by a base station.

The aim of the invention is therefore to propose a device, a server and a system which allows to determine, in a distributed wireless cellular network, the cell operation domain of a cell or cells managed by a base station.

To that end, the present invention concerns a first base station managing a neighboring condition and cell area operation of a cell area, the cell area being a cell area of a wireless cellular network, the wireless cellular network comprising a telecommunication network enabling a transfer of information between the first base station and a second base station, where the wireless cellular network comprises a server linked to the telecommunication network. The base station includes a first unit that receives, at the first base station and from the server, information identifying the second base station in the telecommunication network, the information identifying the second base station being used for establishing a connection between the first and second base stations, a second unit that establishes a direct connection between the first base station and the second base station through the telecommunication network based on the information identifying the second base station received by the first unit, a third unit that receives, at the first base station, information representative of an operation domain of a second cell area managed by the second base station, a fourth unit that selects, at the first base station, an operation domain of a first cell area managed by the first base station based on the information representative of the operation domain of the second cell area.

According to a particular feature, the first base station includes a fifth unit that releases the connection between the first base station and the second base station.

According to a particular feature, in the first base station the fifth unit selects whether the connection between the first base station and the second base station is ready to be released before releasing the connection between the first base station and the second base station.

According to a particular feature, in the first base station, the information representative of operation domain of the first cell area comprises a parameter used for performance of appropriate operation in said first base station.

According to a particular feature, the information representative of operation domain of the first cell area comprises at least a parameter corresponding to one of frequencies, time slots, and codes used for operations in said first base station.

According to a particular feature, the first base station includes a sixth unit that sends, from the first base station to the second base station, information representative of the operation domain of the first cell area managed by the first base station.

The present invention concerns a first base station managing a neighboring condition and cell area operation of a cell area, the cell area being a cell area of a wireless cellular network. the wireless cellular network comprising a telecommunication network enabling a transfer of information between the base station and a second base station, wherein the wireless cellular network comprises a server linked to the telecommunication network. The first base station includes a first unit that establishes a direct connection between the first base station and the second base station through telecommunication network based on the information identifying the second base station, a second unit that receives, at the first base station, information representative of an operation domain of a second cell area managed by the second base station, and a third unit that selects, at the first base station, an operation domain of a first cell area managed by the first base station based on the information representative of the operation domain of the second cell area.

The present invention concerns also a system for managing a neighboring condition and cell area operation of a cell area, the cell area being a cell area of a wireless cellular network, the wireless cellular network comprising a telecommunication network enabling a transfer of information between a first base station and a second base station of the system, where the wireless cellular network comprises a server linked to the telecommunication network. The system includes a first base station and a second base station. The first base station includes a first unit that receives, at the first base station and from the server, information identifying the second base station in the telecommunication network, the information identifying the second base station being used for establishing a connection between the first and second base stations, a second unit that establishes a direct connection between the first base station and the second base station through the telecommunication network based on the information identifying the second base station received by the first unit, a third unit that receives, at the first base station, information representative of an operation domain of a second cell area managed by the second base station, and a fourth unit that selects, at the first base station, an operation domain of a first cell area managed by the first base station based on the information representative of the operation domain of the second cell area. The second base station includes a fifth unit that sends, to the server, information identifying the second base station in the telecommunication network, the information identifying the second base station being used for establishing the connection between the first and second base stations, and a sixth unit that sends, to the first base station via the established connection, information representative of the operation domain of the second cell area managed by the second base station.

According to a particular feature in the system, the first base station includes a seventh unit that releases the connection between the first base station and the second base station.

According to a particular feature, in the system, the first base station includes an eighth unit that sends, from the first base station to the second base station, information representative of the operation domain of the first cell area managed by the first base station.

According to a particular feature, in the system, the second base station includes a ninth unit that receives, from the first base station, information representative of the operation domain of the first cell area managed by the first base station.

According to a particular feature, in the system, the information representative of operation domain of the first cell area comprises a parameter used for performance of appropriate operation in said first base station.

According to a particular feature, in the system, the information representative of operation domain of the first cell area comprises at least a parameter corresponding to one of frequencies, time slots, and codes used for operations in said first base station.

The present invention concerns also a system for managing a neighboring condition and cell area operation of a cell area, the cell area being a cell area of a wireless cellular network, the wireless cellular network comprising a telecommunication network enabling a transfer of information between a first base station and a second base station of the system, wherein the wireless cellular network comprises a server linked to the telecommunication network. The system includes a first base station and a second base station. The first base station includes a first unit that establishes a direct connection between the first base station and the second base station through the telecommunication network based on the information identifying the second base station received by the first unit, a second unit that receives, at the first base station, information representative of an operation domain of a second cell area managed by the second base station, and a third unit that selects, at the first base station, an operation domain of a first cell area managed by the first base station based on the information representative of the operation domain of the second cell area. The second base station includes a fourth unit configured to send, to the first base station via the established connection, information representative of the operation domain of the second cell area managed by the second base station.

BRIEF DESCRIPTION OF THE DRAWINGS

The characteristics of the invention will emerge more clearly from a reading of the following description of an example embodiment, the said description being produced with reference to the accompanying drawings, among which.

DETAILED DESCRIPTION OF THE PREFERRED EMBODIMENTS

Figure 1:
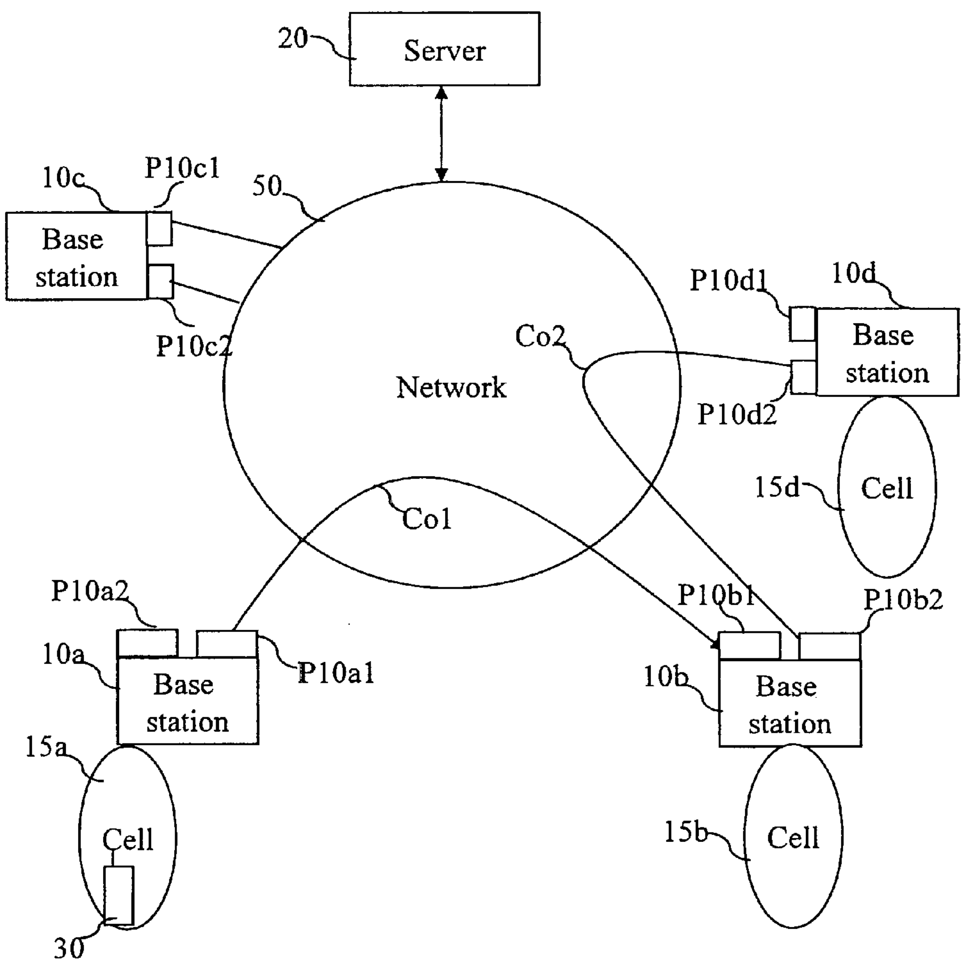
FIG. 1 is a diagram representing the architecture of the wireless cellular network according to the present invention.

FIG. 1 is a diagram representing the architecture of the wireless cellular network according to the present invention.

In the wireless cellular network of the FIG. 1, several base stations 10*a*, 10*b*, 10*c* and 10*d* are linked each other through a telecommunication network 50. The base stations 10*a* to 10*d* access through the same telecommunication network 50 to services provided by a server 20.

Each base station 10*a* to 10*d* is in charge of at least one cell 15 where in mobile terminals 30 which are located within that cell 15 can detect a pilot signal and establish or receive some communications through the base stations 10 which manage the cells 15.

In the FIG. 1, only one cell 15*a*, 15*b* and 15*d* is shown respectively for each of the base stations 10*a*, 10*b* and 10*d*, but we can understand that a more important number of cells are managed by a base station 10 in the present invention.

A cell 15 may be defined as a set of geographical locations to which a given base station 10 provides the best quality of received pilot signals by the mobile terminals 30 comprised in that cell 15 among pilot signals of other neighbouring cells 15.

For the sake of simplicity, the cell managed by the base station 10*c* is not shown in the FIG. 1.

In the FIG. 1, only four base stations 10*a* to 10*d* are shown, but we can understand that a more important number of base stations 10 can be used in the present invention. On a similar way, only one server 20 is shown, but we can understand that a more important number of servers can be used in the present invention.

The server 20 stores information about all the base stations 10*a* to 10*d* which are linked to the telecommunication network 50. These information are information representative of the geographical location of the different base stations 10*a* to 10*d*, the International Base Subscriber Identifier of each of the base station 10. With such information, the server 20 is able to determine which given base station 10 of the base stations 10*a* to 10*d* is geographically neighbour to a given base station 10.

The telecommunication network 50 is a dedicated wired network or a public network like a public switched network or an IP based network or a wireless network or a combination of above cited networks.

The telecommunication network 50 connects the base stations 10 and the server 20 together and allows the transfer of messages between the base stations 10 and between each base station 10 and the server 20 according to the present invention.

Each base station 10 is connected to the telecommunication network 50 through at least one link. Preferably, each base station 10 is connected to the telecommunication network 50 through at least two links.

Such links are more preferably physical or logical access ports. An access port allows the transfer of information between two base stations 10*a* to 10*b*.

The base station 10*a* has two access ports noted P10*a*1 and P10*a*2, the base station 10*b* has two access ports noted P10*b*1 and P10*b*2, the base station 10*c* has two access ports noted P10*c*1 and P10*c*2 and the base station 10*d* has two access ports noted P10*d*1 and P10*d*2.

For the sake of simplicity, only two access ports are shown in the Fig. for each of the base stations 10*a* to 10*d*, but we can understand that a more important number of access ports are used in the present invention.

The general principal of the present invention is that the wireless telecommunication network is built from interconnected base stations 10, which can individually serve multiple cells 15. When a new base station 10, as example the base station 10*b* is added to the wireless telecommunication network, such base station 10*b* connects itself to the server 20 and declares to the server 20 the list of access ports P10*b*1 and P10*b*2 to be used for further communication with the other base stations 10.

For such newly added base station 10*b*, the server 20 determines a large list of neighbouring base stations 10 that are assumed, according to a first criterion, to be neighbours to the base station 10*b*. Such first criterion is as example based on the distance which separates the base stations 10. More precisely, a base station 10 is neighbour of another base station 10 if the distance which separates the base stations 10 is below a predetermined distance. When two base stations 10 are neighbours, the cells 15 they are managing respectively can be considered as potential neighbouring cells.

Such list of neighbouring base stations 10 is transmitted back to the base station 10*b*, together with the address and at least an access port identifier of each the neighbouring base station 10.

The server 20 transmits a list comprising the address and access ports number of the neighbour base stations 10*a* and 10*d* according to the first criterion to the base station 10*b*.

Then, the base station 10*b* establishes some permanent physical or logical connection with its neighbour base stations 10*a* and 10*d*.

The connection between the base stations 10*a* and 10*b* is noted Co1 in the FIG. 1 and is made through the links P10*a*1 and P10*b*1.

The connection between the base stations 10*b* and 10*c* is noted Co2 in the FIG. 1 and is made through the links P10*b*2 and P10*b*2.

Once the inter-base station 10 connection is ready, the base station 10*b* retrieves some information related to the operation domain used by the involved neighbour cells managed by neighbour base stations 10 such as frequency, time slot, codes . . . .

From this information, the base station 10*b* decides on its own, of an acceptable operation domain for its own cell 15*b* and then informs its neighbouring base stations 10*a* and 10*d* that it starts operation of its radio cell 15*b* on the selected operation domain. The base stations 10*a* and 10*d* then add the new cell 15*b* in their individual neighbouring cells lists for broadcasting, so that the mobiles terminals 30 served by their respective cells 15*a* and 15*d* can now measure the signals of the newly added cell 15*b* in order to proceed, if necessary, to handover procedure with the newly added cell 15*b*. On its side, the base station 10*b* starts to broadcast in its cell 15*b*, for the same reason, the neighbouring cells list of cell 15*b*.

After some given time, the base station 10*b* checks whether or not the cells 15*a*, 15*d* of its neighbouring base stations 10*a* and 10*d* are neighbours of its cell 15*b* according to a second criteria, which is different from the first one. Such second criteria is, as example, representative of the quantity of information transferred through each of the connections Co1 and Co2 used for establishing handovers between its cells 15*b* and the potential neighbours cells 15*a* or 15*d*.

The base station 10*b* decides that a given cell 15*a* is no longer a neighbour to its cell 15*b*, when it determines that the quantity of information in relation to handover across cells 15*a* and 15*b*, as observed across connection Co1, is marginal with respect to its own activity. In such case, the base station 10*b* reconfigures the neighbouring cells list broadcasted in cell 15*b*, so that mobile terminals 30 located in cell 15*b* no longer make measurements on cell 15*a* in order to prepare handover.

Similarly, under such occasion, the base station 10*a* may decide autonomously to remove any cell 15*b* from the neighbouring cells list of any of its cell 15*a*.

The base station 10*b* initiates a base station disconnection procedure with one of its neighbouring base stations 10*a* and 10*d*, when it determines that the activity of the connection with a base station 10 is marginal with respect to its own activity. In such case, the base station 10*b* stops the connection with the base station 10. If that base station 10 is the base station 10*d*, the connection Co2 is then released and the associated access ports becomes available at both base stations 10*b* and 10*d* for further connection to some other base stations 10. To that end, the releasing base station 10*b* informs the server 20 that its access port P10*b*2 is now available, and that it is no longer connected to the base station 10*d* via the access port P10*d*2.

The neighbouring cells lists for the cells of base station 10*b* and 10*d* are updated accordingly.

Then, the neighbouring cells lists converge to a restricted number of neighbours.

In case of handover procedure, the communication contexts of the mobile terminals 30 are then exchanged across base stations 10*a* and 10*b*, 10*b* and 10*d* via the connections Co1 and Co2.

It has to be noted here that, the general principle of the present invention is disclosed in an example wherein each base station 10 manages one cell 15. When a base station 10 manages plural cells 15, the same process is executed for each of the cells 15 managed by the base station 10.

Figure 2:
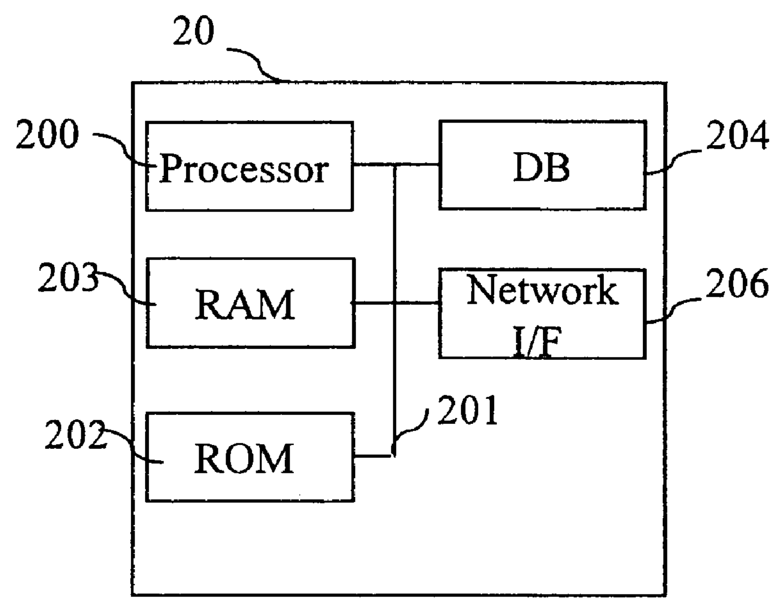
FIG. 2 is a diagram representing the architecture of a server according to the present invention.

FIG. 2 is a diagram representing the architecture of a server according to the present invention.

Figure 5:
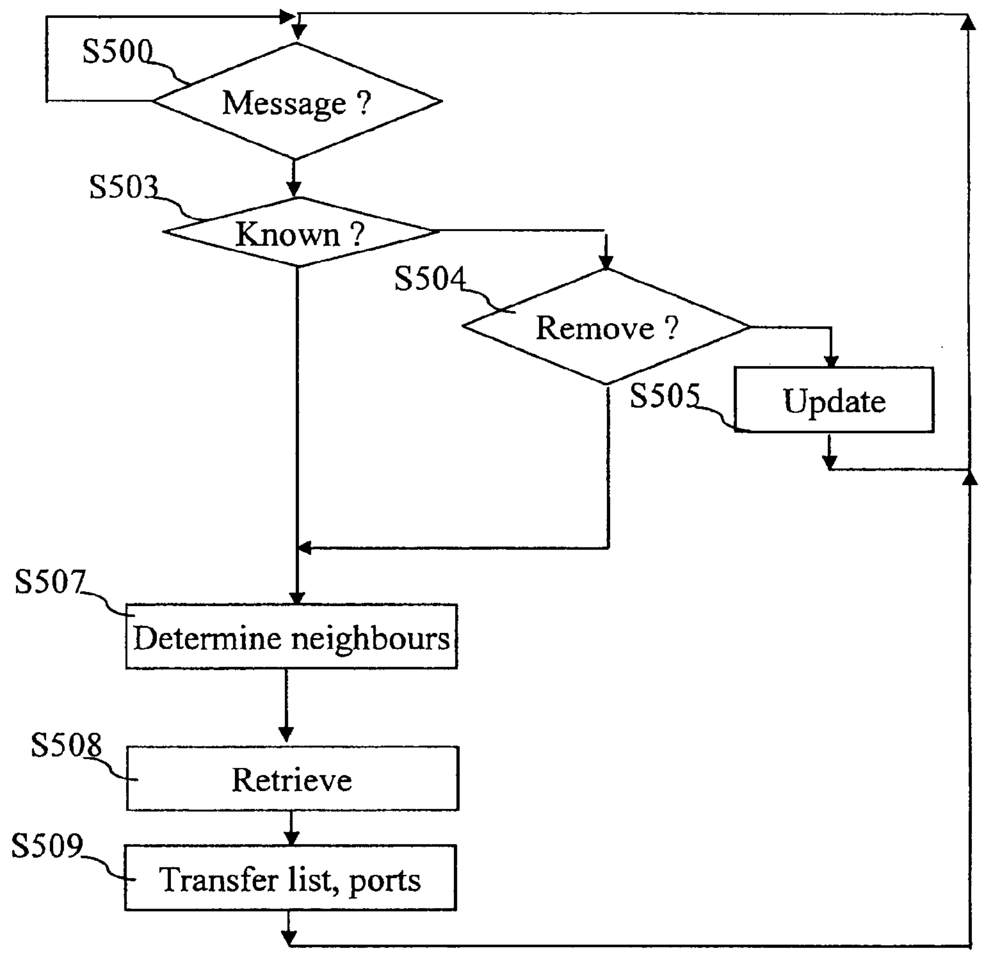
FIG. 5 is an algorithm executed by the server when a base station is installed in the wireless cellular network according to the present invention.

The server 20 has, for example, an architecture based on components connected together by a bus 201 and a processor 200 controlled by programs as disclosed in the FIG. 5.

The bus 201 links the processor 200 to a read only memory ROM 202, a random access memory RAM 203, a telecommunication network interface 206 and a data base 204.

The memory 203 contains registers intended to receive variables, and the instructions of the programs related to the algorithm as disclosed in the FIG. 5.

The processor 200 executes the algorithm as disclosed in the FIG. 5.

The read only memory 202 contains instructions of the programs related to the algorithm as disclosed in the FIG. 5 which are transferred, when the server 20 is powered on to the random access memory 203.

The server 20 is connected to the telecommunication network 50 through the network interface 206. As example, the network interface 206 is a DSL (Digital Subscriber Line) modem, or an ISDN (Integrated Services Digital Network) interface, or PLC (Power Line Communication) interface, or a wireless interface, etc. Through such interface, the server 20 transfers information to the base stations 10 as it will be disclosed in reference to the FIG. 5.

The database 204 comprises all information related to the bases stations 10 like information representative of their geographical location, the International Base Subscriber Identifier of each of the base station 10, the available access ports of the base stations 10.

Figure 3:
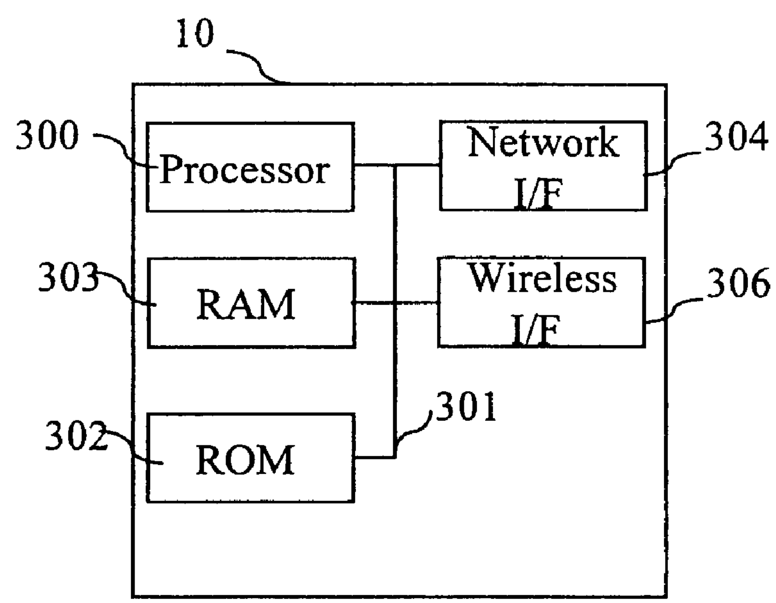
FIG. 3 is a diagram representing the architecture of a base station according to the present invention.

FIG. 3 is a diagram representing the architecture of a base station according to the present invention.

Figure 4:
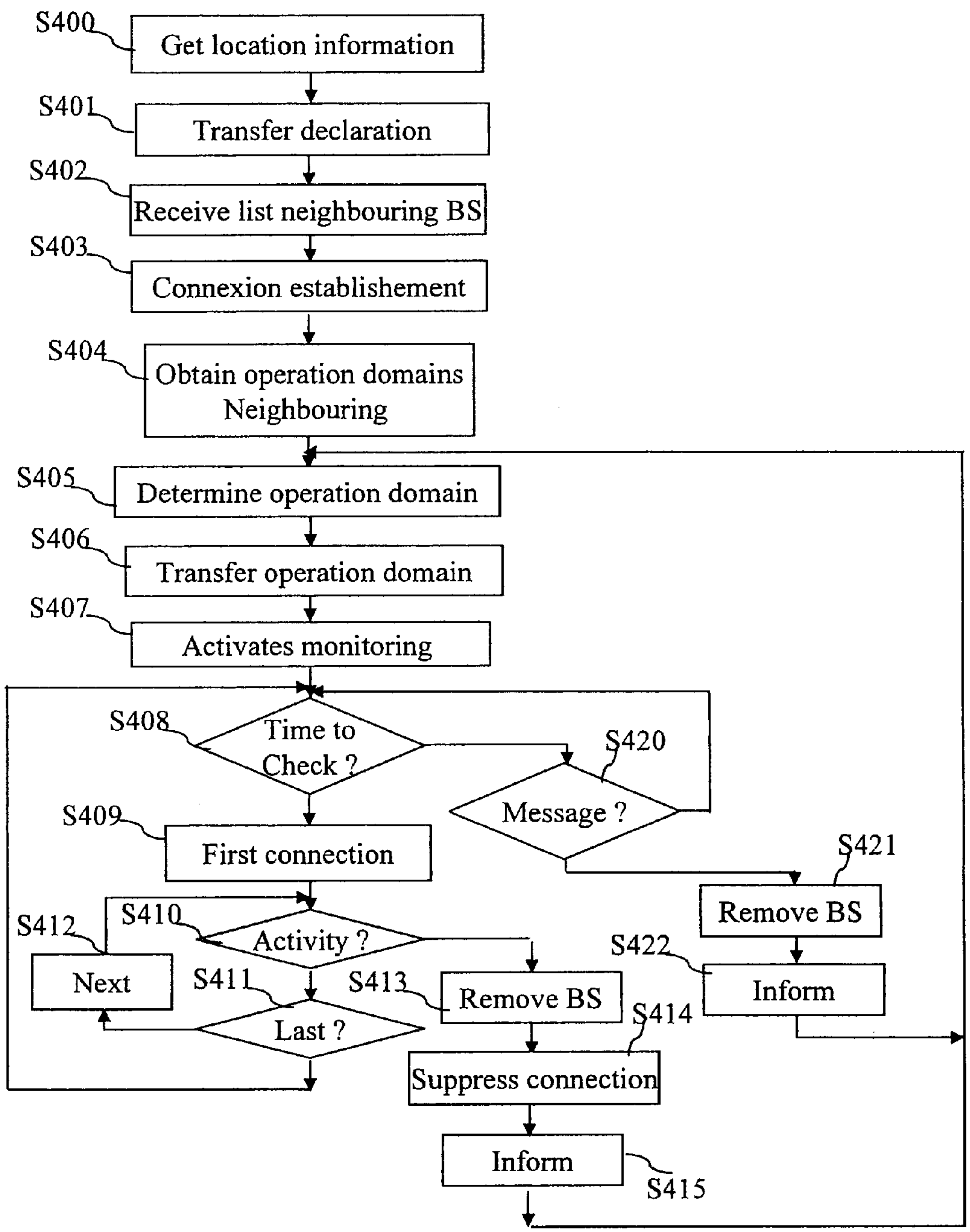
FIG. 4 is an algorithm executed by a base station when it is installed in the wireless cellular network according to the present invention.
Figure 6:
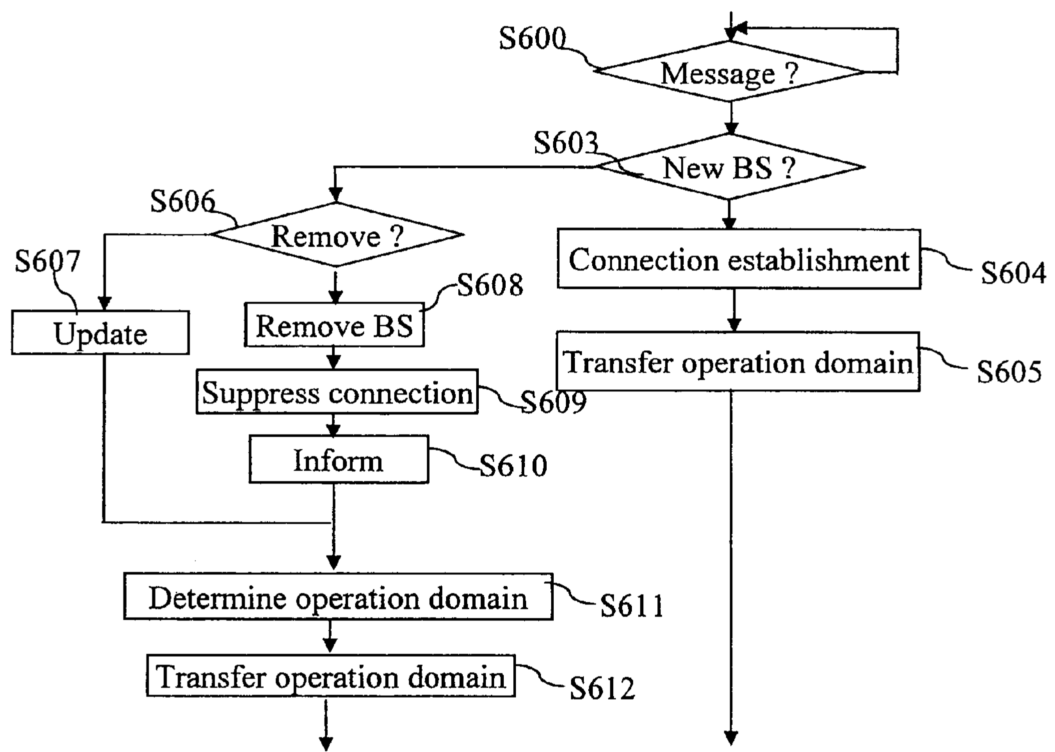
FIG. 6 is algorithm executed by a neighbouring base station of a base station installed in the wireless cellular network according to the present invention.

The base station 10 has, for example, an architecture based on components connected together by a bus 301 and a processor 300 controlled by programs as disclosed in the FIGS. 4 and 6.

The bus 301 links the processor 300 to a read only memory ROM 302, a random access memory RAM 303, a network interface 304 and a wireless interface 306.

The memory 303 contains registers intended to receive variables, the list of neighbouring base stations, the neighbouring cells list of its cell 15, the operation domain of each of the neighbouring cells 15 and the instructions of the programs related to the algorithms as disclosed in the FIGS. 4 and 6.

The processor 300 controls the operation of the network interface 304 and the wireless interface 306.

The read only memory 302, contains instructions of the programs related to the algorithms as disclosed in the FIGS. 4 and 6 which are transferred, when the base station 10 is powered on to the random access memory 303.

A base station 10 is connected to the telecommunication network 50 through the network interface 304. As example, the network interface 304 is a DSL, (Digital Subscriber Line) modem, or an ISDN (Integrated Services Digital Network) interface, or PLC (Power Line Communication) interface, or a wireless interface, etc. Through such interface, the base station 10 exchanges information which the server 20 and the neighbour base stations 10 which manage potential neighbouring cells 15.

The network interface 304 comprises several access ports. Each access port is used for a dedicated connection with a base station 10 which manages at least one neighbouring cell 15. It has to be noted here that one common access port can be dedicated for the negotiation with unknown base stations of a given access port which will be used latter for the connection. Another specific access port can be dedicated for the signalling with the server 20.

The wireless interface 306 allows to communicate with the mobile terminals 30 which are in the cells 15 of the base station 10. The wireless interface 306 contains one radio antenna or multiple radio antennas, each radio antenna serving a given cell 15 of base station 10.

FIG. 4 is an algorithm executed by a base station when it is installed in the wireless cellular network according to the present invention.

Such algorithm is, as example, executed by the processor 300 of a base station 10 when it is installed and connected to the telecommunication network 50 or when it is powered on or when it is moved from one location to another one.

At step S400, the processor 300 obtains information representative of the location of the base station 10. Such information is obtained, as example and in a non limitative way, from the person who installs the base station 10 through a man machine interface not shown in the FIG. 3 or through a Global Positioning System (GPS) device included within the base station 10 or connected to it. As example and in a non limitative way, the information representative of the location of the base station 10 is the post address of the building wherein the base station 10 is located, the phone number allocated to a telephone line within the building wherein the base station 10 is located or any other network address which permits to retrieve the post address of the building wherein the base station 10*b* is located, or the GPS coordinates of the base station 10 or the latitude, longitude and altitude of the position of the base station 10.

The information representative of the location of the base station 10 can be also the amplitude of signals and identifiers of base stations 10 comprised in that signals, which are transmitted by some base stations 10 in their respective cells 15 and received by the base station 10 or by a device connected to the base station 10.

At step S401, the processor 300 commands the transfer of a registration message to the server 20. The registration message comprises the information representative of the location of the base station 10 previously obtained, the telecommunication network address of the base station 10 and the identifier of each of its access, ports. As example, if the base station 10 is the base station 10*b*, the processor 300 commands the transfer of the network address of the base station 10*b* and the identifiers of the access ports P10*b*1 and P10*b*2 of the base station 10*b*. In a variant of realization, the base station 10*b* transfers only the identifier of an access port P10*b*1 or P10*b*2 which has to be used for the negotiation of further connections or for the initialization of further connections with some other base stations 10. In another variant of realization, the base station 10*b* also transfers the identifier of one access port P10*b*1 or P10*b*2 which is dedicated to communication with the server 20.

At next step S402, the processor 300 receives a response message from the server 20 through the telecommunication network 50. The response message comprises the list of neighbouring base stations 10 determined by the server 20 according to the first criterion. The list of neighbouring base stations 10 comprises the addresses, within the telecommunication network 50, of the base stations 10 which are neighbours of the base station 10*b* according to the first criterion. According to the example of the FIG. 1 the list comprises the addresses of the base station 10*a* and 10*d*.

More precisely, the list of neighbouring base stations 10 comprises also, for each of the base stations 10*a* and 10*d* which are neighbours of the base station 10*b*, the identifier of at least one access port available for future connection.

At next step S403, the processor 300 establishes connections with at least some of the base stations 10 which are comprised in the list of neighbouring base stations.

More precisely, if the number of available access ports of the base station 10*b* is smaller than the number of the base stations 10 comprised in the list of neighbouring base stations, the processor 300 establishes connections with a subset of its neighbouring base stations 10 and memorizes the remaining part in the RAM memory 303.

A connection is established through the telecommunication network 50 between two bases stations 10 by reserving an access port of each of the base station 10 through which, a permanent signalling logical connection is established between the two base stations 10. Such access port reservation can be made, in a variant, during a negotiation phase through a common access port, dedicated to the negotiation of access ports. Preferably, no more than one connection is established between two base stations 10, even though these base stations 10 may involve neighbouring conditions between more than two of their cells 15.

The logical connection can be as example and in a non limitative way, compatible with the TCP (Transmission Control Protocol) or the UDP (User Datagram Protocol) protocol, to be used on top of IP signalling.

Each base station 10 allocates a unique identifier to each connection. Such identifier is the identifier of the access port or the access port number. The combination of an access port number and the IP address of a base station 10 form then a unique socket. The IP address is used to identify a base station 10, and the access port number identifies the connection itself.

So, when the base station 10*b* establishes a bi-directional signalling connection with another base station 10, as example the base station 10*a*, it sends its messages together with its IP address, the IP address of the base station 10*a*, the identifier of the access port it has reserved for that connection and with an identifier of an access port that is still available at the base station 10*a*. Similarly, the base station 10*a* addresses the base station 10*b* with the IP address of the base station 10*b* and with the access port identifier received from the base station 10*b*.

In another implementation mode of the invention, all the base stations 10 use the same single fixed access port for the purpose of common signalling between base stations 10. The signals exchanged between the base stations 10 over that access port carry the identification of the emitting base station 10 but later, a connection is established through negotiated access port.

A first connection noted Co1 is then established between the base station 10*b* and the base station 10*a* through their respective access ports P10*b*1 and P10*a*1. A second connection noted Co2 is then established between the base station 10*b* and the base station 10*d* through their respective access ports P10*b*2 and P10*d*2.

At the same step, the processor 300 transfers a message to the server 20 informing it that the access port of each successful connection is now unavailable.

Through the respective established connections Co1 and Co2, at step S404, the processor 300 obtains and stores in RAM memory 303 the list of cells 15*a* and 15*d* managed by its neighbouring base station 10*a* and 10*d* and the operation domain of cells 15*a* and 15*d* managed by its neighbouring base station 10*a* and 10*d*.

The operation domain of a cell 15 managed by a base station 10 comprises, as example and in a non limitative way, the frequencies used by the base station 10 in its cell 15 and/or the time slots used by the base station 10 in its cell 15 and/or the codes used by the base station 10 in its cell 15.

Each neighbouring base station 10 transfers through the established connection with the base station 10*b*, the operation domain of its cell 15.

At step S405, the processor 300 determines the operation domain of its cell 15*b*.

For that, the processor 300 builds an occurrence table of usage among cells 15 of neighbouring base stations 10 stored in RAM memory 303 at step S404 of the operation domains it has received and stored in RAM memory 303 at step S404.

The processor 300 selects for its cell 15*b* the operation domain among those of smallest occurrence observed among the cells 15 of its neighbouring base stations 10. When the base station 10*b* controls more than one cell 15*b*, the table also includes the operation domain of its cells 15*b*. Each time an operation domain is chosen for one cell 15*b*, the table of usage of the operation domains is updated. Then, the operation domain of subsequent cells 15*b* is selected among those of smallest occurrence and not yet being selected for other cells 15*b*.

Preferably, the processor 300 selects for its cell 15*b* the operation domain among those of smallest occurrence observed among only the cells 15 of its neighbouring base stations 10 that are neighbour to cell 15*b*.

In another yet preferred embodiment, the probability of selection of an operation domain of a neighbouring cell 15*a* of the cell 15*b* is a decaying function of the monitored information quantifying the neighbourhood relationship between the cell 15*a* and the cell 15*b*, that is collected in step S407.

At next step S406, the processor 300 transfers the operation domains of the cell 15*b* back to its neighbouring base stations 10*a* and 10*d* through the respective connections Co1 and Co2, so that they can maintain their own occurrence table of usage of the operation domains.

At next step S407, the processor 300 activates the monitoring of the information transferred through the connections Co1 and Co2 established at step S403.

The information monitored are, as example, the messages transferred to and/or received from a neighbouring base station 10*a* which are related to handover procedures of mobiles terminals 30 comprised in their respective cells 15.

A handover procedure occurs when a mobile terminal 30 is in communication with another telecommunication device through a given base station 10*b* in an initial cell 15*b* and moves to a cell 15*a* of a neighbouring base station 10*a*. During the handover procedure, the given base station 10*b* has to stop to serve the mobile terminal 30 and the neighbouring base station 10*a* has to start to serve the mobile terminal 30 enabling the continuation of the communication. During a soft handover procedure, the neighbouring base station 10*a* has to start to serve the mobile terminal 30, while the given base station 10*b* keeps serving the mobile terminal 30, enabling macro-diversity, and the simultaneous continuation of the communication over multiple cells.

If an handover procedure is engaged by a mobile terminal 30, it means that the mobile terminal 30 receives pilot signals from the cell 15*a* with a higher power strength than the one of the pilot signals of the cell 15*b* while still being located in the initial cell 15*b*, and that the cell 15*a* is an effective neighbouring cell of the cell 15*b* of the base station 10*b*. When a handover procedure between two base stations 10 is realised, some specific signalling messages are exchanged between the two base stations 10.

Using these information over numerous consecutive or parallel handover procedures involving more than one mobile terminal 30, it is possible, for the base station 10*b* to determine which are, among the cells 15 of its neighbouring base stations 10, the neighbouring cells of each of its cell 15*b*.

As example, and in a non limitative way, each time a message related to a handover procedure from/to cell 15*b* to/from cell 15*a* managed by base station 10*a* is transferred through the connection Co1, the processor 300 increments a counter associated to the neighbourhood between cell 15*b* and cell 15*a* of base station 10*a*. Each time a message related to a handover procedure from/to cell 15*b* to/from cell 15*d* managed by base station 10*d* is transferred through the connection Co2, the processor 300 increments a counter associated to the neighbourhood between cell 15*b* and cell 15*d* of base station 10*a* and 10*d*.

As another example, each time a message related to a handover procedure is transferred trough the connection Co1, the processor 300 increments a counter associated to the connection Co1. Each time a message related to a handover procedure is transferred trough the connection Co2, the processor 300 increments a counter associated to the connection Co2.

At next step S408, the processor 300 determines if whether or not it has to check if the cells 15 of its neighbouring base stations 10 are or not neighbouring cells of its cells according to the second criterion.

As example and in a non limitative way, the processor 300 determines that it has to check if the cells 15 of its neighbouring base stations 10 are neighbouring cells of its cells according to the second criterion, after a predetermined time of operation of the base station 10*b* and/or periodically and/or when the amount of information transferred through the connections Co1 and Co2 reaches a predetermined quantity.

If the processor 300 has to check if the cells 15 of its neighbouring base stations 10 are neighbouring cells of its cells according to the second criterion, the processor 300 moves to step S409. In the opposite, the processor 300 moves to the step S420.

At step S420, the processor 300 checks whether or not it has received a message from a neighbouring base station 10 informing it that the neighbouring base station 10 suppresses the connection with it.

If no message is received, the processor 300 returns to step S408.

If such message is received, the processor 300 moves to step S421.

At step S421, the processor 300 removes from the list of neighbouring base stations, the base station 10 which sent message. The processor 300 also removes from the neighbouring cells list of its served cell 15*b*, the cell or cells 15 served by the base station 10 which sent the message, and removes the operation domain of the cell or cell 15 served by that base station 10 from the table of usage of the operation domains.

At next step S422, the processor 300 transfers a message to the server 20 informing it that the connection between the base station 10*b* and the other base station 10 which sent the message at step S408, is broken and that the access port of that connection is now available for further access.

The processor 300 returns then to the step S405 in order to define a new operation domain for its cell 15. As far as the operation domain of a cell is defined according to the operation domains of the neighbouring cells and/or according to the monitored information collected at step S407, it is interesting to conduct a new determination of an operation domain for its cell.

It has to be noted here that, if the processor 300 has established at step S403 connections with a subset of its neighbouring base stations 10, the processor 300 moves to step S403, considers a base station 10 of the remaining part of base stations 10 memorized and in the RAM memory 303 and continue the present algorithm.

At step S409, the processor 300 considers the first connection with one of its potential neighbouring base stations 10. As example, the processor 300 considers the connection Co1.

At next step S410, the processor 300 checks whether or not, there is some activity on that connection, and updates the cell neighbouring conditions according to the monitored information.

For that, in one realisation mode of the invention, the processor 300 reads the value of the counter associated to the connection under process. If the value of the counter is upper than a predetermined threshold, the processor 300 decides that there is some activity on that connection and moves to step S411. On the contrary, the processor 300 moves to step S413.

It has to be noted here that in a variant of realization, the processor 300 calculates the sum of the values of each of the counters associated to the connections Co1 and Co2, divides the value of the counter associated to the connection under process by the calculated sum and compare it to a predetermined threshold.

In another realisation mode of the invention, the processor 300 reads the value of the counter associated to the neighbourhood between each cell 15*b* of the base station 10*b* and the each cell 15*a* of the distant base station 10*a*. If the value of the counter is upper than a first predetermined threshold, and that cell 15*a* is not yet part of the neighbouring cells list of cell 15*b*, the cell 15*a* is added to the neighbouring cells list of cell 15*b*. If the value of the counter is below a second predetermined threshold, and that cell 15*a* is part of the neighbouring cells list of cell 15*b*, the cell 15*a* is removed from the neighbouring cells list of cell 15*b*. When this is done for all cells 15*b* and 15*a*, the processor 300 informs the wireless interface 306 to start to broadcast the updated neighbouring cells list of the cell 15*b*.

It has to be noted here that in a variant of realization, the processor 300 calculates the sum of the values of each of the counters, divides the value of each of the counters associated to the connection under process by the calculated sum and compare it to a predetermined threshold.

At step S411, the processor 300 checks whether or not there are some other connections for which the activity has not been checked.

If there is at least one connection for which the activity has not been checked, the processor 300 moves to step S412, considers another connection and returns to step S410.

If there is no more connection for which the activity has not been checked, the processor 300 returns to step S408.

At step S413, the processor 300 removes from the list of neighbouring base stations, the base station 10 through which it is connected through the connection under process. The processor 300 also removes from the neighbouring cells list of its served cell 15, the cell served by the base station 10 which it is connected through the connection under process and removes the operation domain of the cell served by that base station 10 from the table of usage of the operation domains.

As far as the amount of handovers between the cells of two base stations is limited or null, it means that, despite the base stations 10 are neighbours, their respective cells 15 can not be considered as neighbours according to the second criterion.

At next step S414, the processor 300 sends a message to the base station 10 it is linked through the connection under process, informing it that the connection is suppressed and releases the access port of that connection.

At next step S415, the processor 300 transfers a message to the server 20 informing it that the access port of that connection is now available. Preferably, the processor 300 informs also the server that the access port of the neighbour base station 10 used for that connection is now available.

The processor 300 then returns to the step S405 in order to define a new operation domain for its cell 15.

It has to be noted here that, if the processor 300 has established at step S403 connections with a subset of its potentials neighbouring base stations 10, the processor 300 moves to step S403, considers a base station 10 of the remaining part of base stations memorized and in the RAM memory 303 and executes the algorithm as already been explained.

FIG. 5 is an algorithm executed by the server when a base station is in stalled in the wireless cellular network according to the present invention.

The present algorithm is executed by the processor 200 of the server 20.

At step S500, the processor 200 checks whether or not a message is received from the network interface 206. As far as no message is received, the processor 200 executes the loop constituted by the step S500.

If a message is received from the network interface 206, the processor 200 stores the contents of the message in the RAM memory 203 and moves to step S503.

At step S503, the processor 200 checks whether or not the base station 10 which sent the message has already accessed to the server 20. For that, the processor 200 checks whether or not a list of neighbouring base stations has been created for the base station 10 or if the database 204 comprises the list of the available access ports of the base station 10.

If the base station 10 which sent the message has already accessed to the server 20, the processor 200 moves to step S504. On the contrary, the processor 200 moves to step S507.

At step S507, the processor 200 determines, according to a first criterion, the neighbouring base stations 10 of the base station 10 which sent the message.

The first criterion, is preferably the distance between the base stations geographical locations.

From information representative of the geographical location of the base station 10 which was comprised in the received message, that was stored in RAM 203 at step S500, the processor 200 consults the database 204 and determines the set of base stations 10 that are in the vicinity of that location, with a predetermined distance criterion or a distance criterion chosen so as to find a given number of neighbouring base stations 10.

If the information representative of the location of the base station 10 which sent the message is the post address of the building wherein the base station 10 is located, the processor 200 determines from the post address, the latitude, longitude and altitude of the base station 10 and determines the set of base stations 10 that are in the vicinity of that location.

If the information representative of the location of the base station 10 which sent the message is the phone number allocated to a telephone line within the building wherein the base station 10 is located, the processor 200 determines from the phone number, a post address, and then the latitude, longitude and altitude of the base station 10*b* and determines the set of base stations 10 that are in the vicinity of that location.

If the information representative of the location of the base station 10 which sent the message are the GPS coordinates of the base station 10 or the latitude, longitude and altitude of the position of the base station 10, the processor 200 determines the set of base stations 10 that are in the vicinity of that location.

If the information representative of the location of the base station 10 are the amplitude of the signals and identifiers measured by the base station 10 which sent the message, the processor 200 determines from such identified signals an estimation of the latitude, longitude and altitude of the base station 10 and determines the set of base stations 10 that are neighbour to that estimated location.

At next step S508, the processor 200 retrieves from the database 204, for each base station 10 which is in the vicinity of the base station 10 which sent the message, its address within the telecommunication network 50 and the identifier of at least one available access port. The processor 200 then adds in the database 204, the information representative of the geographical location of the base station 10, which was comprised in the received message, the determined list of neighbouring base station 10, with their address and the selected available access port for each base station 10 comprised in the determined list. At next step S509, the processor 200 commands the transfer, through the telecommunication network 50, to the base station 10 which sent the message, of a response message which comprises the list of neighbouring base stations 10.

The list of neighbouring base stations 10 contains the address of base station 10 which sent the message, the address of each the base station 10 which is in the vicinity of the base station 10 which sent the message, the identifier of an available access port of each base station 10 which is in the vicinity of the base station 10 which sent the message.

Once the message is transferred, the processor 200 returns to the step S500 and waits the reception of a new message to be processed.

If at step S503, the processor 20 determines that the base station 10 which sent the message has already accessed to the server 20, the processor 200 moves to step S504.

At that step, the processor 200 checks whether or not the received message, stored in RAM 203 at step S500 is representative of the availability status of an access port of a base station 10. Such message is as the one transferred at steps S415 or S422 of the algorithm of the FIG. 4.

If the received message is representative of the availability status of an access port of a base station 10, the processor 200 moves to step S505 and updates in the database 204, the access port status in the list of access ports of the base station 10 which sent the message by marking it as available if the availability status indicates that the port is available, or by marking it as unavailable if the availability status indicates that the port is unavailable. If an access port is marked as unavailable, the processor 200 removes the base station 10 which was connected, through that link, to the base station which sent the message, from the list of neighbour base stations of the base station 10 which sent the message.

The processor 200 returns to the step S500 and waits the reception of a new message to be processed.

If the received message is not representative of the availability status of an access port of a base station 10, the processor 200 moves to step S507 already described and continue the process of the message.

FIG. 6 is algorithm executed by a neighbouring base station of a base station installed in the wireless cellular network according to the present invention.

At step S600, the processor 300 of the base station 10*a*, as example, checks whether or not a message is received from the network interface 304. As far as no message is received, the processor 300 executes the loop constituted by the step S600.

If a message is received from the network interface 304, as example from the base station 10*b*, the processor 300 stores the message in the RAM 203 and moves to step S603.

At step S603, the processor 300 checks whether or not the base station 10 which sent the message is known or not by the processor 300. For that, the processor 300 checks whether or not the message has been received from an already established connection.

If the base station 10 which sent the message is known, the processor 300 moves to step S606. On the contrary, the processor 300 moves to step S604.

At the step S604, the processor 300 proceeds to a connection establishment in response to the one as disclosed at step S403 of the FIG. 4.

At the same step and in a variant of realisation, the processor 300 transfers a message to the server 20 informing it that the access port of that connection is now unavailable.

At next step S605, the processor 300 transfers the operation domains of its cells 15 to the base station 10 which sent the message. Then processor 300 then returns to step S600.

At step S606, the processor 300 checks if the received message is a message informing the base station 10 that the connection between the base station 10 and the base station 10 which sent the message is released.

If the message is not a connection release message, the message stored in the RAM 203 at step S600 comprises the operation domain of the cell or cells of the base station 10 which sent the message. The processor 300 moves then to the step S607 and updates its occurrence table of usage of the operation domains of the cells 15 of its neighbouring base stations 10.

After that, the processor 300 moves to step S611 which will be disclosed latter.

If the message is a connection release message, the processor 300 moves to step S608.

At that step S608, the processor 300 removes from the list of neighbouring base stations, the base station 10 which sent the message, removes from the occurrence table of usage of operation domains the cells served by the base station 10 which sent the message, removes the operation domain of the cell of that base station 10 from the table of usage of the operation domains and removes that cell from the neighbouring cells lists. For each cell being served by the base station 10, the processor 300 indicates to the wireless interface 306 to start broadcasting an updated neighbouring cells list.

At step S609, the processor 300 releases the connection with the base station 10 which sent the message.

In a variant of realisation, the processor 300 transfers at step S610 a message to the server 20 informing it that the access port used for the released connection is now available. The processor 300 then moves to step S611.

At next step S611, the processor 300 determines the operation domain of its cell 15 using the modified table of usage of the operation domains.

The processor 300 selects for its cell 15 the operation domain among those of smallest occurrence observed among the cells of its neighbouring base stations 10. When the base station 10 controls more than one cell, the table also includes the operation domain of all of its cells 15. Each time an operation domain is chosen for one cell 15, the table of usage of the operation domain is updated. Then, the operation domain of subsequent cells 15 is selected among those of smallest occurrence and not yet being selected for other cells 15.

In a preferred embodiment, the processor 300 selects for the cell 15 of its base station 10, the operation domain among those of smallest occurrence observed among only the cells 15 of its neighbouring base stations 10 that are neighbour to the cell 15 of its base station 10.

At next step S612, the processor 300 transfers the determined operation domains of its cell 15 to all its neighbouring base stations 10 through the respective connections. Then, the processor 300 returns back to step S600.

Naturally, many modifications can be made to the embodiments of the invention described above without departing from the scope of the present invention.

The invention claimed is:

1. A first base station managing a neighboring condition and cell area operation of a cell area, the cell area being a cell area of a wireless cellular network, the wireless cellular network comprising a telecommunication network enabling a transfer of information between the first base station and a second base station, wherein the wireless cellular network comprises a server linked to the telecommunication network, the first base station comprising:

a first unit configured to receive, at the first base station and from the server, information identifying the second base station in the telecommunication network, the information identifying the second base station being used for establishing a connection between the first and second base stations;

a second unit configured to establish a direct connection between the first base station and the second base station through the telecommunication network based on the information identifying the second base station received by the first unit;

a third unit configured to receive, at the first base station, information representative of an operation domain of a second cell area managed by the second base station; and a fourth unit configured to select, at the first base station, an operation domain of a first cell area managed by the first base station based on the information representative of the operation domain of the second cell area.

2. The first base station according to claim 1, further comprising:

a fifth unit configured to release the connection between the first base station and the second base station.

3. The first base station according to claim 2, wherein the fifth unit is further configured to select whether the connection between the first base station and the second base station is ready to be released before releasing the connection between the first base station and the second base station.

4. The first base station according to claim 1, wherein the information representative of operation domain of the first cell area comprises a parameter used for performance of appropriate operation in said first base station.

5. The first base station according to claim 4, wherein the information representative of operation domain of the first cell area comprises at least a parameter corresponding to one of frequencies, time slots, and codes used for operations in said first base station.

6. The base station according to claim 1, further comprising:

a sixth unit configured to send, from the first base station to the second base station, information representative of the operation domain of the first cell area managed by the first base station.

7. A first base station managing a neighboring condition and cell area operation of a cell area, the cell area being a cell area of a wireless cellular network, the wireless cellular network comprising a telecommunication network enabling a transfer of information between the first base station and a second base station, wherein the wireless cellular network comprises a server linked to the telecommunication network, the first base station comprising:

a first unit configured to establish a direct connection between the first base station and the second base station through the telecommunication network based on information identifying the second base station;

a second unit configured to receive, at the first base station, information representative of an operation domain of a second cell area managed by the second base station; and a third unit configured to select, at the first base station, an operation domain of a first cell area managed by the first base station based on the information representative of the operation domain of the second cell area.

8. A system for managing a neighboring condition and cell area operation of a cell area, the cell area being a cell area of a wireless cellular network, the wireless cellular network comprising a telecommunication network enabling a transfer of information between a first base station and a second base station of the system, wherein the wireless cellular network comprises a server linked to the telecommunication network, the system comprising:

the first base station including:

a first unit configured to receive, at the first base station and from the server, information identifying the second base station in the telecommunication network, the information identifying the second base station being used for establishing a connection between the first and second base stations, a second unit configured to establish a direct connection between the first base station and the second base station through the telecommunication network based on the information identifying the second base station received by the first unit, a third unit configured to receive, at the first base station, information representative of an operation domain of a second cell area managed by the second base station, a fourth unit configured to select, at the first base station, an operation domain of a first cell area managed by the first base station based on the information representative of the operation domain of the second cell area, and the second base station including:

a fifth unit configured to send, to the server, information identifying the second base station in the telecommunication network, the information identifying the second base station being used for establishing the connection between the first and second base stations, and a sixth unit configured to send, to the first base station via the established connection, information representative of the operation domain of the second cell area managed by the second base station.

9. The system according to claim 8, further comprising:

a seventh unit configured to release the connection between the first base station and the second base station.

10. The system according to claim 8, wherein the first base station further comprises an eighth unit configured to send, from the first base station to the second base station, information representative of the operation domain of the first cell area managed by the first base station.

11. The system according to claim 8, wherein the second base station further comprises a ninth unit configured to receive, from the first base station, information representative of the operation domain of the first cell area managed by the first base station.

12. The system according to claim 10, wherein the information representative of operation domain of the first cell area comprises a parameter used for performance of appropriate operation in said first base station.

13. The system according to claim 10, wherein the information representative of operation domain of the first cell area comprises at least a parameter corresponding to one of frequencies, time slots, and codes used for operations in said first base station.

14. A system for managing a neighboring condition and cell area operation of a cell area, the cell area being a cell area of a wireless cellular network, the wireless cellular network comprising a telecommunication network enabling a transfer of information between a first base station and a second base station of the system, wherein the wireless cellular network comprises a server linked to the telecommunication network, the system comprising:

the first base station including:

a first unit configured to establish a direct connection between the first base station and the second base station through the telecommunication network based on information identifying the second base station, a second unit configured to receive, at the first base station, information representative of an operation domain of a second cell area managed by the second base station, a third unit configured to select, at the first base station, an operation domain of a first cell area managed by the first base station based on the information representative of the operation domain of the second cell area, and the second base station including:

a fourth unit configured to send, to the first base station via the established connection, information representative of the operation domain of the second cell area managed by the second base station.

* * * * *